US012671573B2

(12) United States Patent
Bax et al.

(10) Patent No.: US 12,671,573 B2
(45) Date of Patent: Jun. 30, 2026

(54) SYSTEM AND METHOD FOR MERGING SKETCHES VIA KEY OBFUSCATION AND APPLICATIONS THEREOF

(71) Applicant: YAHOO ASSETS LLC, New York, NY (US)

(72) Inventors: Eric Bax, Sierra Madre, CA (US); Charlie Dickens, London (GB)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/582,138

(22) Filed: Feb. 20, 2024

(65) Prior Publication Data

US 2025/0266986 A1 Aug. 21, 2025

(51) Int. Cl.
*H04L 9/08* (2006.01)

(52) U.S. Cl.
CPC ........ *H04L 9/0816* (2013.01); *H04L 2209/16* (2013.01)

(58) Field of Classification Search
CPC ........................... H04L 9/0816; H04L 2209/16
See application file for complete search history.

(56) References Cited

U.S. PATENT DOCUMENTS

| | | | | |
|---|---|---|---|---|
| 10,027,542 B2 * | 7/2018 | Coster | ................. | H04L 41/0893 |
| 11,442,792 B2 * | 9/2022 | Kyaw | ................... | G06F 9/5077 |
| 11,726,958 B2 * | 8/2023 | Chen | .................. | G06F 12/1018 |
| | | | | 707/748 |

| | | | | |
|---|---|---|---|---|
| 2012/0124605 A1 * | 5/2012 | Praden | ............. | H04N 21/25891 |
| | | | | 725/14 |
| 2016/0105346 A1 * | 4/2016 | Pignataro | ........... | H04L 41/0894 |
| | | | | 370/253 |
| 2018/0083850 A1 * | 3/2018 | Rabipour | .............. | H04L 43/022 |
| 2021/0006413 A1 * | 1/2021 | Burbank | ............... | G06Q 50/00 |
| 2021/0167954 A1 * | 6/2021 | Weiss | .................... | H04L 9/0861 |
| 2021/0359836 A1 * | 11/2021 | Wright | ................... | H04L 9/085 |
| 2022/0103646 A1 * | 3/2022 | Heffernan | ............. | H04L 67/535 |
| 2022/0138218 A1 * | 5/2022 | Rao | ........................ | G06F 16/285 |
| | | | | 707/738 |
| 2022/0350901 A1 * | 11/2022 | Shiravi | .............. | G06F 21/6245 |

OTHER PUBLICATIONS

Lingtong Liu , "FO-Sketch: A Fast Oblivious Sketch for Secure Network Measurement Service in the Cloud", Electronics 2021, 10(16), 2020; https://doi.org/10.3390/electronics10162020 , Submission received: Jul. 22, 2021 / Revised: Aug. 18, 2021 / / Published: Aug. 20, 2021, 29 pages (Year: 2021).*
Publisher: IEEE, "Matching Noisy Keys for Obfuscation", Published in: 2023 IEEE International Conference on Big Data (BigData) Date of Conference: Dec. 15-18, 2023, 8 pages (Year: 2023).*

* cited by examiner

*Primary Examiner* — Shahriar Zarrineh
(74) *Attorney, Agent, or Firm* — Venable LLP

(57) ABSTRACT

The present teaching relates to merging data sketches from different data sketch sources. To satisfy performance metrics specified with respect to quality of a merged sketch, sketch merging parameters are generated, which include a first set of parameters for creating obfuscated keys of the data sketches and a second set of parameters for identifying matching obfuscated keys. Keys of the data sketches are obfuscated using the first set of sketch merging parameters. The data sketches are merged by identifying matching obfuscated keys in accordance with the second set of sketch merging parameters to generate a merged sketch.

17 Claims, 13 Drawing Sheets

100

Receive performance specification 210

Generate parameters via performance metrics 220

Receive sketches with noisy keys 230

Merge sketches with noisy keys via similarity threshold 240

Receive a query related to merged sketch 250

Generate a response to query via merged sketch 260

Receive $s$ & performance specification 330

Determine $p_f$ to meet required $p_R$ for all $s$ sources 340

Determine $t$ based on $p_f$ to meet specified $p_U$ 350

Determine $n$ based on $t$ to meet required $p_M$ 360

Output the sketch merging parameters 370

Receive sketches from sources 1, ..., s 505

Consolidate sketches from each of the sources 515

Create all pairs of noisy keys from different sources 525

Determine the similarity of noisy keys in each pair 535

Identify matching pairs of noisy keys via *t* 545

Merge sketched based on identified matches 555

SYSTEM AND METHOD FOR MERGING SKETCHES VIA KEY OBFUSCATION AND APPLICATIONS THEREOF

BACKGROUND

1. Technical Field

The present teaching generally relates to electronic content processing. More specifically, the present teaching relates to merging information with privacy protection.

2. Technical Background

With the development of the Internet and the ubiquitous network connections, more and more aspects of daily life are now conducted via electronic means through different services that are backed by online data and analytics. For example, Yahoo provides users in different countries an online platform for content in different categories and user activities and content consumption data may be collected at different relevant locales. Amazon offers its online commerce platform to enable users in different continents to conduct millions of transactions. Data related to such transactions, users involved therein (sellers, buyers) and service-related information (e.g., delivery, satisfaction, and returns) associated each locale may be gathered as confidential business data. Data storage service providers may offer their services with a large geographic coverage with, e.g., cloud-based storage across different regions/countries. Advertisers may leverage existing service platforms to display advertising information on products/campaigns to users located in different locales, states, countries, or even continents. Given the current state of the online world, data associated with business operations may be collected digitally and may be accessed for, e.g., data analytics for improvement.

Different players rendering services may adaptively enhance their operations by first understanding the characteristics of their users' activities with respect to their services. Such characteristics may be localized, e.g., different characteristics may be exhibited in different locales. For example, a number of user queries on a certain topic may differ from locale to locale, depending on, e.g., demographics of the users in each locale. The characteristics associated with the whole operation across different jurisdictions may also be important when it comes to a policy decision for the entire business operation. For instance, a "count distinct query" may ask for a count of distinct users who have been shown a particular advertisement. To respond to this inquiry, the count of distinct users may be determined based on information collected from different locales where the advertisement had been shown. Another example is related to frequency estimation, i.e., estimating a distribution of item frequencies over items in a data set. In this case, if the item is a product being sold online across different jurisdictions (e.g., Amazon sells a shaver to users in different countries), to answer to the question needs to be based on sales data collected from these jurisdictions.

To determine the overall count of distinct users across multiple jurisdictions, such data recorded by different jurisdictions may be combined to determine the overall count of distinct users. With the increasingly restrictive requirement to protect private data, sketches have been used in place of raw data. Some sketches hash identifiers to produce hash codes, then transmit hash code-value pairs as the sketch, where the value is, e.g., a count or some other number. Different sketches created by different entities may be merged to generate a single sketch with combined information. For example, an online advertising broker may run campaigns across different vendors and may need to estimate statistics for advertising campaigns over multiple vendors. But the vendors may want to avoid revealing sensitive statistics or data to the broker or other vendors. As a solution, vendors can send data sketches with sufficient noise to obfuscate the data, e.g., on each vendor's contribution to query results over the combined data. However, as merging sketches traditionally relies on hashing, which has the characteristic that the same input always maps to the same output. Some sketches may utilize hash codes as keys to allow a party to infer, with high probability, that a particular identifier is included in the data that generated the sketch. This us due to that data privacy driven research addresses obfuscation of the data.

Thus, there is a need for a solution that can tackle the issue associated with the conventional approach to extract attributes from textual content from different domains.

SUMMARY

The teachings disclosed herein relate to methods, systems, and programming for information management. More particularly, the present teaching relates to methods, systems, and programming related to content processing and categorization.

In one example, a method, implemented on a machine having at least one processor, storage, and a communication platform capable of connecting to a network for merging data sketches from different data sketch sources. To satisfy performance metrics specified with respect to quality of a merged sketch, sketch merging parameters are generated, which include a first set of parameters for creating obfuscated keys of the data sketches and a second set of parameters for identifying matching obfuscated keys. Keys of the data sketches are obfuscated using the first set of sketch merging parameters. The data sketches are merged by identifying matching obfuscated keys in accordance with the second set of sketch merging parameters to generate a merged sketch.

In a different example, a system is disclosed for merging data sketches from different data sketch sources. The system includes a performance-driven sketch merging parameter (PDSMP) generator and a noisy key-based sketch merger. The performance-driven sketch merging parameters (PDSMP) generator is provided for generating specified performance metrics with respect to quality of a merged sketch, including a first set of parameters for creating obfuscated keys of the data sketches and a second set of parameters for identifying matching obfuscated keys. The noisy key-based sketch merger is provided for merging the data sketches based on obfuscated keys generated via the first set of sketch merging parameters and by identifying matching obfuscated keys in accordance with the second set of sketch merging parameters to generate a merged sketch.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for merging data sketches from different data sketch sources.

To satisfy performance metrics specified with respect to quality of a merged sketch, sketch merging parameters are generated, which include a first set of parameters for creating obfuscated keys of the data sketches and a second set of parameters for identifying matching obfuscated keys. Keys of the data sketches are obfuscated using the first set of sketch merging parameters. The data sketches are merged by identifying matching obfuscated keys in accordance with the second set of sketch merging parameters to generate a merged sketch.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
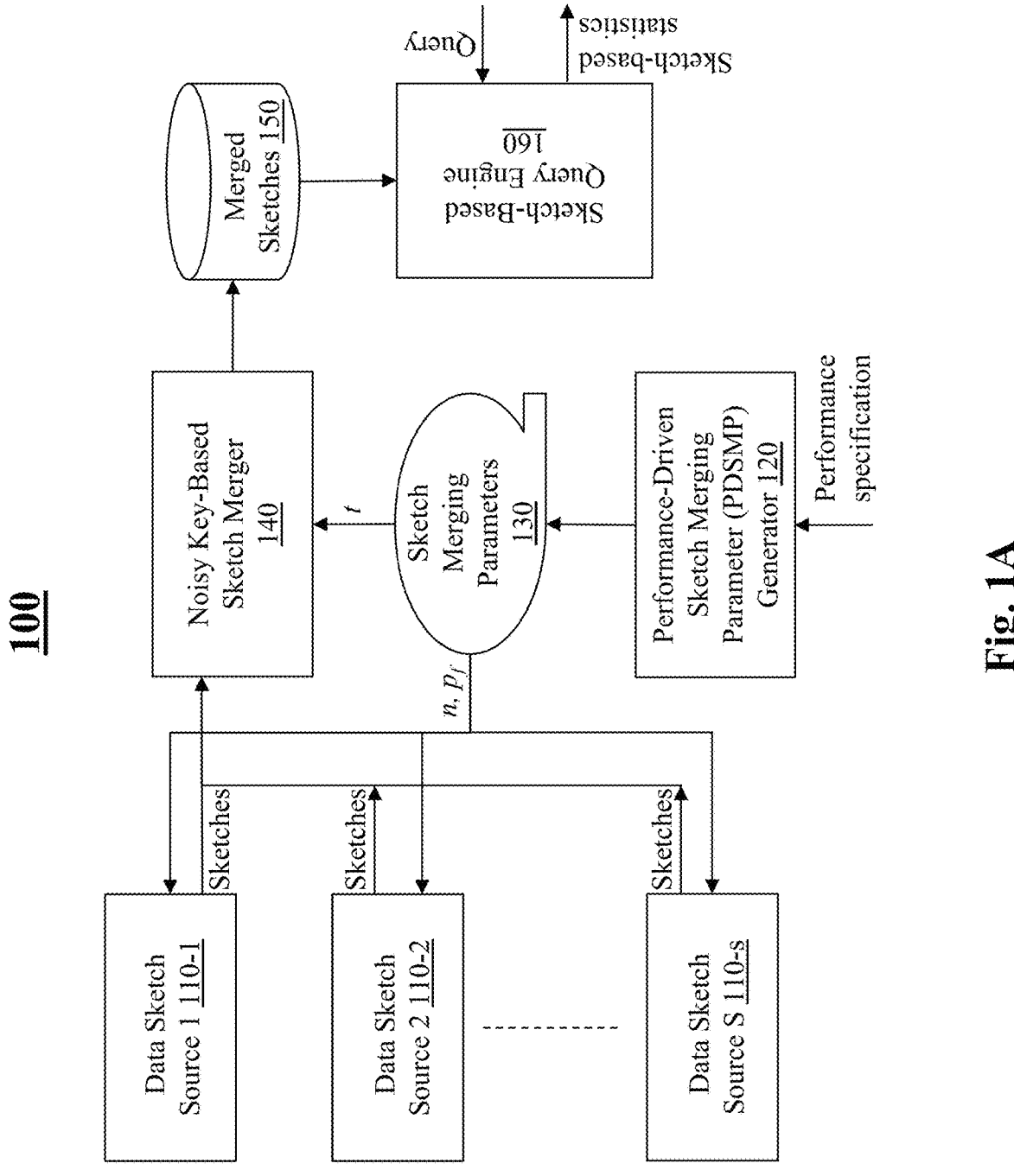
FIG. 1A depicts an exemplary high-level system diagram of a framework for merging sketches via obfuscated (noisy) keys and application thereof to support queries on merged sketches, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching discloses a framework for merging sketches based on noisy keys for protecting data privacy. Noisy keys may be generated Noisy keys may be generated via obfuscation based on obfuscation parameters determined based on required performance. In merging sketches based on obfuscated noisy keys, matching may be carried out based on obfuscated keys and matches may be identified with respect to a threshold, also determined based on specified requirement. Keys (e.g., identifiers) in sketches may be coded, e.g., as hash codes, and such codes may be obfuscated according to the present teaching to generate noisy codes. In some embodiments, to obfuscate a code of a certain length, each binary bit of the code may be perturbed (flipped in value) according to a given probability. The obfuscated code represents a noisy key (with a perturbed bit value on different positions). When sketches are merged, keys that match may be identified. With obfuscated keys, noisy keys corresponding to the same original key (matching keys) may be identified via a similarity-based scheme. That is, for each pair of noisy keys, a similarity measure (such as a distance) may be computed based on the noisy keys and is then compared with a threshold to determine whether the two noisy keys in the pair probabilistically belong to the same original key.

According to the present teaching, the operational parameters involved in obfuscation (the length of a code for a key and the probability used for perturbing each bit in the code) and in merging for identifying matching noisy keys (the threshold on the similarity between two noisy keys) may be generated automatically based on performance metrics directed to the merged sketch. Such performance metrics may be specified based on the need of an application. In some embodiments, such performance metrics may include a false positive probability (i.e., the probability of considering two noisy keys as matching while they are not), a false negative rate (i.e., the probability of considering two noisy keys not matching but they are), and a consistency rate (i.e., the probability that the median of noisy keys obtained via obfuscation from the same original key equal to the original key).

The present teaching discloses a method to automatically derive the operational parameters for generating noisy keys for sketches and them merging sketches based on such generated noisy keys based on the specified performance metrics. In this manner, keys of sketches to be merged may be obfuscated and the merging operation may be carried out using the similarity threshold based on parameters that ensure that the merged sketch satisfies the specified performance metrics corresponding to, e.g., expected quality of the merged sketch.

Figure 1B:
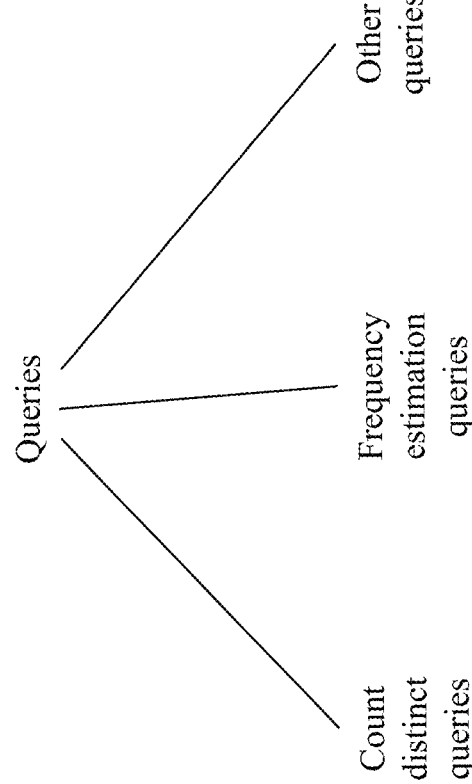
FIG. 1B shows exemplary types of queries on merged sketches generated in accordance with an embodiment of the present teaching.

FIG. 1A depicts an exemplary high-level system diagram of a framework 100 for merging sketches via obfuscated (noisy) keys and application thereof to support queries on merged sketches, in accordance with an embodiment of the present teaching. As stated herein, there are different applications based on sketches that are generated by merging sketches from different sources. Certain information may be important to be consolidated based on information from different sources. For instance, as shown in FIG. 1B, a query may relate to a count of distinct queries/users. For instance, an advertiser may like to know a count of distinct queries on an advertisement that is campaigned in multiple jurisdictions. As another illustration, an online seller may like to know the frequency distribution of a product across different geographical regions/countries. There may be other applications in which a response to a query may rely on data (sketch) that combine information from all relevant sources (sketches). Due to difference in regulations on data privacy, disclosure of some information in sketches collected by different sources may be legally prohibited.

Figure 1C:
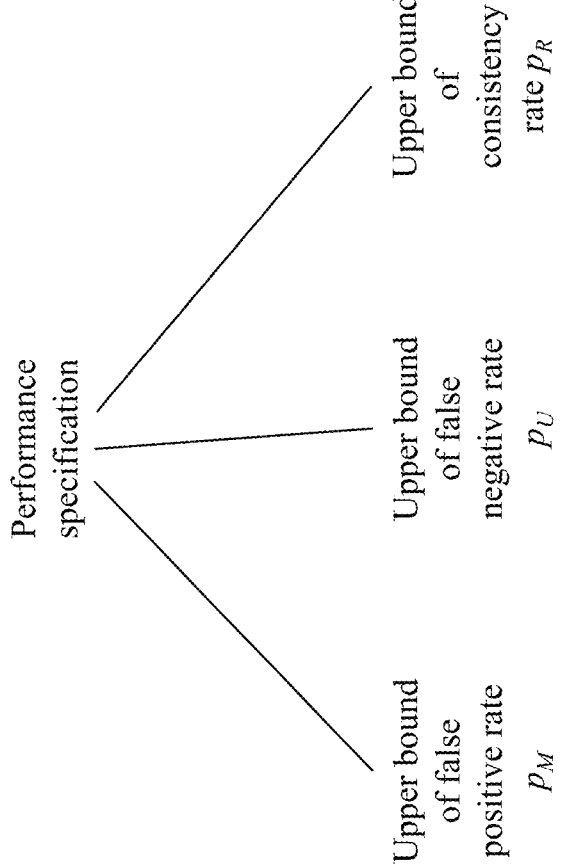
FIG. 1C illustrates exemplary types of performance metrics to be achieved in merging sketches based on obfuscated (noisy) keys, in accordance with an embodiment of the present teaching.

As discussed herein, to address such issues, the present teaching discloses an adaptive scheme to obfuscate keys in sketches from different sources and merge these sketches via obfuscated keys to achieve specified performance requirement without disclosing private information. FIG. 1C illustrates exemplary types of performance metrics to be achieved in merging sketches based on obfuscated (noisy) keys, in accordance with an embodiment of the present teaching. As illustrated, the performance metrics may include an upper bound of a false positive rate or $P_M$, an upper bound of a false negative rate $P_U$, . . . , and an upper bound of a consistency rate $P_R$. As presented above, a false positive instance is defined as an event where a pair of noisy keys is considered as matching while they are not. Given that, the upper bound of a false positive rate or $P_M$ limits the rate of such an event in a merging process. The false negative instance is defined as an event where a pair of noisy keys is considered as not match but they are. Given that, the upper bound of false negative rate $P_U$ limits the rate of such an event. A consistency event is defined as follows. Given an original key and a plurality of noisy keys generated with respect to the same original key, the median of the plurality of noisy key is the same as the original key. If each noisy corresponds to a code of length n, then a median key derived from the plurality of noisy key is to take a median value on each of the n bits across the plurality of noisy keys.

Figure 1D:
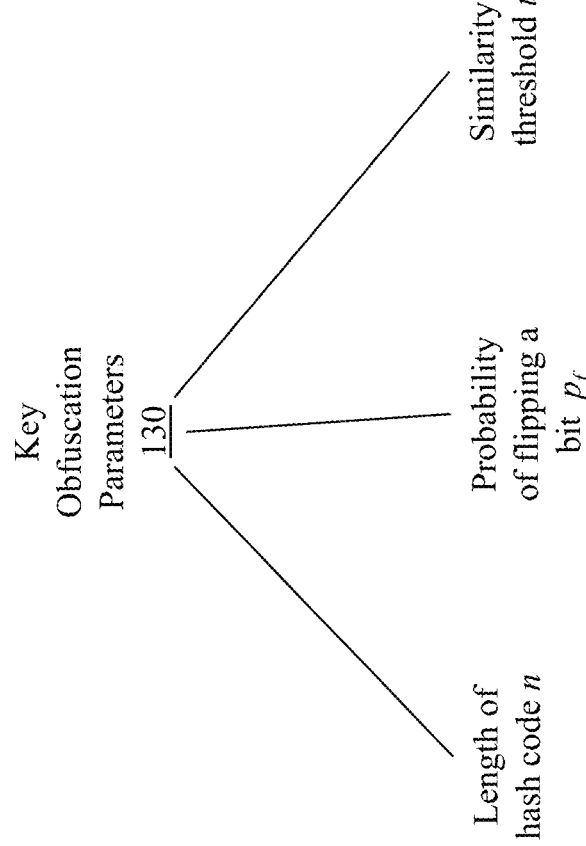
FIG. 1D illustrates exemplary obfuscation parameters generated based on specified expected merging performance, in accordance with an embodiment of the present teaching.

Also as discussed herein, based on specified performance metrics, different operational parameters may be automatically generated according to the present teaching. When such generated operational parameters are used to obfuscate the keys in sketches from different sources to generate noisy keys, which are then used to merge the sketches, the merged sketch satisfies the specified performance metrics. FIG. 1D shows exemplary operational parameters generated based on specified performance metrics, in accordance with an embodiment of the present teaching. As illustrated, the operational parameters for noisy key based sketch merging may include a length of code, n, for encoding the keys, a probability $p_f$ of perturbing the binary bits in a code of length n, and a threshold t for a similarity measure computed based on a pair of codes of length n obfuscated based on $p_f$. The details on how to determine these operational parameters based on specified performance metrics as shown in FIG. 1C and the use thereof to merge sketches are provided with reference to FIGS. 3A-5B.

Referring to FIG. 1A, the framework 100 as illustrated herein comprises a plurality of S data sketch sources 110, including data sketch source 1 110-1, data sketch source 2 110-2, . . . , data sketch source K 110-s, a performance-driven sketch merging parameter (PDSMP) generator 120, a noisy key based sketch merger 140, and a sketch-based query engine 160. Each of the data sketch sources stores data collected therein and produces sketches with noisy keys based on the stored data. The data sketch sources 110 transmit their sketches with noisy keys to the noisy key-based sketch merger 140, which may cluster the noisy keys into clusters having zero or one noisy keys from each data sketch source. The noisy key-based sketch merger 140 is provided for carrying out a merge process to place all noisy keys resulting from the same value into a cluster without other noisy keys, for each distinct value. If only one data source has a value, then the goal is to place its noisy key into a "singleton cluster" with only that noisy key. Utilizing noisy keys is to make it difficult to infer the hash code from any noisy key, even when each data source supplies a noisy key for the same value.

The PDSMP generator 120 is provided for generating, in accordance with the present teaching, sketch merging parameters 130 based on specified performance metrics. As discussed herein, the specified performance metrics may include $P_M$, $P_U$, and $P_R$ that provide upper bounds of various quality related measures. Some of the sketch merging related parameters (e.g., n and $p_f$) are provided to the data sketch sources 110 for generating obfuscated keys of the sketches and some (e.g., threshold t) to the noisy key-based sketch merger 140 for merging sketches based on noisy keys. The merged sketch generated based on the sketch merging parameters created in accordance with the specified performance metrics meets the required performance as specified and may then be stored in a storage 150. The sketch-based query engine 160 is provided to handle queries and to search for responses based on the stored merged sketches in 150. For example, a query may be related to a count of distinct users reached by an advertisement which is campaigned on different platforms associated with the S data sketch sources.

Figure 2:
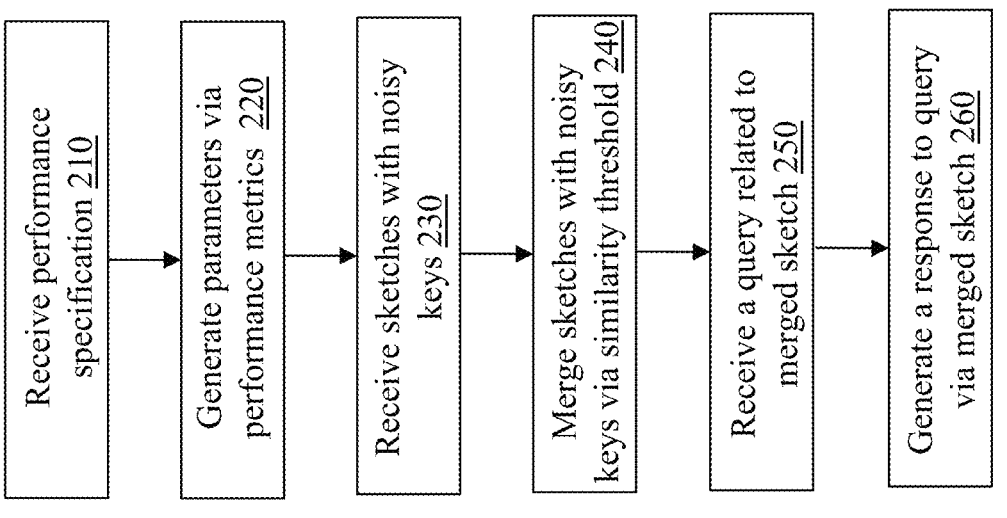
FIG. 2 is a flowchart of an exemplary process for a framework for merging sketches with noisy keys and application thereof to support queries on merged sketches, in accordance with an embodiment of the present teaching.

FIG. 2 is a flowchart of an exemplary process of the framework 100 for merging sketches via obfuscated (noisy) keys and application thereof to support queries on merged sketches, in accordance with an embodiment of the present teaching. When the PDSMP generator 120 receives, at 210, a specification of performance metrics, it generates, at 220, various sketch merging related parameters, including, e.g., the key obfuscation parameters (e.g., n and $p_f$) and parameters used in merging sketches based on noisy keys (e.g., threshold t). As shown in FIG. 1A, such generated sketch merging parameters are stored in 130, which may be accessed by the data sketch sources 110 to generate sketches with noisy keys according to the obfuscation parameters (n and $p_f$). When a need arises to merge sketches, the noisy key-based sketch merger 140 receives, at 230, sketches with noisy keys from different data sketch sources 110. Based on the received sketches with noisy keys and the sketch merging parameter f, the noisy key-based sketch merger 140 merges, at 240, the sketches received from different data sketch sources 110 to generate a merged sketch. Based on the merged sketches, when the sketch-based query engine 160 receives, at 250, a query related to the merged sketches, it generates, at 260, a response to the query based on the merged sketches stored in 150.

Based on the parameters created to meet the specified performance metrics, different data sketch sources 110 (that contribute the sketches to be merged) utilize key obfuscation parameters to generate, at 230, sketches with noisy keys based on key obfuscation parameters. Based on the sketches from different data sketch sources, the noisy key-based sketch merger 140 merges, at 240, these sketches with noisy keys based on the merging related parameter t generated to ensure that the merged sketch meets the specified performance metrics. The merged sketch may then be stored in 150. Based on the merged sketch, when the sketch-based query engine 160 receives, at 250, a query, it generates, at 260, a response to the query with data (e.g., sketch-based statistics) obtained based on the merged sketch in 150.

Figure 3A:
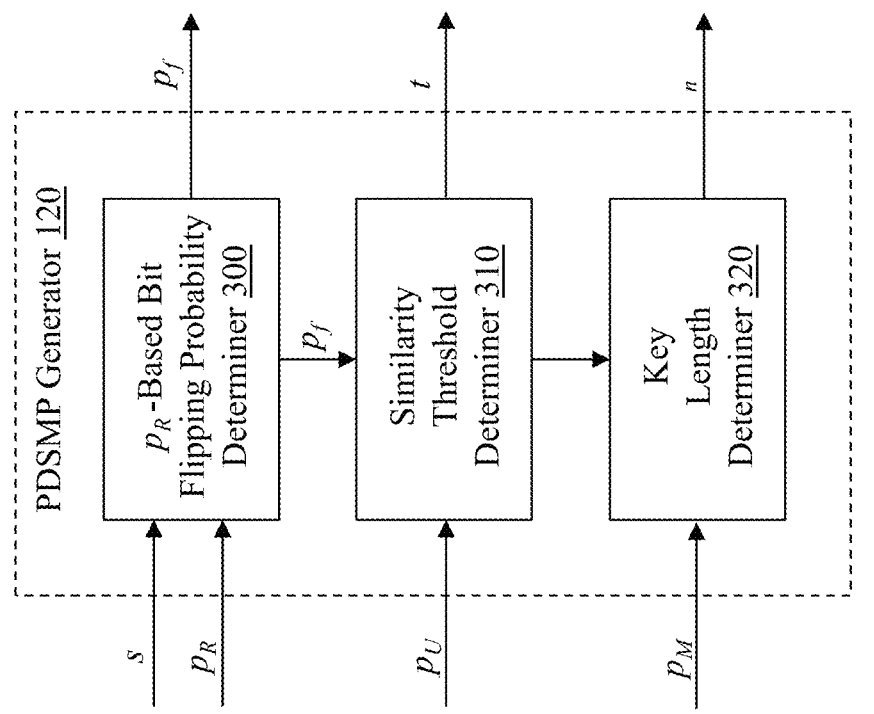
FIG. 3A depicts a high-level system diagram of a performance-driven sketch merging parameter (PDSMP) generator, in accordance with an embodiment of the present teaching.

FIG. 3A depicts a high-level system diagram of the PDSMP generator 120, in accordance with an embodiment of the present teaching. As discussed herein, the PDSMP generator 120 is provided for generating sketch merging parameters 130 based on input with including specified performance metrics. In some embodiments, the specified performance metrics include an upper bound of false positive rate $P_M$ of noisy key based matches during merging sketches, an upper bound of false negative rate $P_U$ of noise key based matches in mering sketches, and a required consistency rate $P_R$ (i.e., the probability that the median of noisy keys obtained via obfuscation from the same original key equal to the original key). In some embodiments, the number of data sketch sources s may also be considered in generating sketch merging parameters. The output sketch merging parameters generated by the PDSMP generator 120 may include a length n of the code used to represent a key (e.g., length of a hash code), the probability $p_f$ of flipping a bit of a code in generating a noisy key, and a threshold t to be used in determining whether two noisy keys match. Detailed formulations to generate sketch merging parameters based on the input are disclosed below.

Given a set of s data sources, each of which has a set of values, for each value a hash function may be applied to obtain a hash code. To create a noisy key, bits in the hash code may be perturbed by, e.g., randomly determining whether the value of each bit is to be flipped. This adds noise to the hash code and the bit flipping is determined with respect to each bit independently. The result is a noisy key. Hash function used for generating hash codes may be publicly accessible to the data sketch sources 110. A noisy key may be generated using independent, private randomness for every source.

For any pair of values $v_a$ and $v_b$ from different data sketch sources, let a and b be the hash codes. Denote noisy keys for a and b by a' and b', respectively. All data sketch sources may use the same public hash function for generating hash codes, so that if $v_a = v_b$ then a=b. Also, assume that if $v_a \neq v_b$, then each bit position in a and b has a probability (over hash functions) of one half for having equal bit values. In some embodiments, using d (a, b) and d (a', b') to represent respective Hamming distances between a pair of hash codes and a pair of noisy keys. If the number of bit positions that have equal bit values is defined as the number of agreements, a Hamming distance may represent the number of bit positions with unequal bit values. That is, d (a, b) may correspond to the number of disagreements between sequences and b. If (a', b') be a pair of noisy keys with a from a different data sketch source than that of b'. As discussed herein, t corresponding to a matching threshold, it may be defined that (a', b') match if d (a', b')<t and not match otherwise.

Given the notations, the false positive event M and false negative event U may be defined as:

$$M : d(a', b') < t \text{ to find a noisy key match for unequal values } v_a \neq v_b.$$

$$U : d(a', b') \geq t \text{ to find unmatched noisy keys for equal values } v_a = v_b.$$

These two events need to be avoided or minimized. The specified performance metrics P and P provide upper bounds to such undesirable events. In addition, given a set of noisy keys from the same value and the original (without noise) hash code for the value, the median key over the set of noisy keys may be defined as a bit sequence with each position's bit value equal to the majority bit value in that position over the set of noisy keys. In the event of a tie, it may be broken in favor of the value in that position in the original hash code. Specifically, if $a_i'=x$ and there is an equal number of bits with value x (e.g., 1) and 1−x (e.g., 0) collected, then the value x may be reported as the median in position 4. That is, key obfuscation fails if the median key is the same as the original hash code. That is, by figuring out the median key over a set of noisy keys, one may estimate the original hash code. Define event R to be that, for each noisy key, the set of noisy keys that shares the same original hash code has a median key the same as that hash code. Therefore, performance metric $P_R$ limits the probability that the median key of noisy keys for the same hash code equal to the original hash code.

Below, the specified performance metrics ($P_M$, $P_U$, and $P_R$) are leveraged to determine operational parameters for merging sketched using noisy keys so that the undesirable events M, U, and R are minimized in accordance with the probabilities and expectations of these desirable events as specified in the performance metrics. Specifically, key length n and noise levels (in terms of bit-flipping probability $p_f$) in generating noisy keys may be determined based on the required performance. In addition, threshold t used in determining whether two noisy keys match may also be accordingly determined. Given s, the number of data sketch sources, assume $m_i$ is the number of noisy keys from data sketch source i for 1≤i≤s. Further assume that noisy keys from the same data sketch source result from distinct values. The sketch merging operation is concerned with matching among pairs of noisy keys from different data sketch sources. Let Q be the set of such pairs, i.e., all pairs of noisy keys except those from the same data sketch source:

$$|Q| = \binom{\sum_{i=1}^{s} m_i}{2} - \sum_{i=1}^{s} \binom{m_i}{2}. \tag{1}$$

If n is the length of each hash code and each resulting noisy key. As discussed herein, $p_f$ is the probability of flipping each bit of a hash code while transforming the hash code into a noisy key.

Let $p_\Delta$ be the probability that the bit-flipping operation alters one bit in one noisy key in a pair of noisy keys but not the same bit of the other noisy key in the pair. As there are 2 flipping choices for each bit, $$p_\Delta = 2p_f(1 - p_f). \tag{2}$$

9

10

It is known that the probability mass function (PMF) of a binomial distribution can be expressed as:

$$b(k, n, p)\binom{n}{k}p^k(1-p)^{n-k}. \tag{3}$$

If $B(k_o, k_f, n, p)$ is used to denote the probability of a binomial random variable having value in a range of $[k_o, k_f]$:

$$B(k_o, k_f, n, p) = \sum_{k=k_o}^{k_f}\binom{n}{k}p^k(1-p)^{n-k} \tag{4}$$

Given that M is an event that for a pair $(a', b') \in Q$, noisy keys a' and b' are considered a match, when they actually correspond to different values a and b, then $P_M$ can be expressed as:

$$p_M = P_r\{d(a', b') < t \mid v_a \neq v_b\} \tag{5}$$

As discussed herein, t is the threshold used to determine a match between two noisy keys, say a' and b', then the probability $P_M$ of a false positive event M is:

$$p_M = B(0, t-1, n, \frac{1}{2}). \tag{6}$$

when the probabilities to assign each bit either 0 or 1 is ½ for each value, independently over bits and between hash codes for $v_a \neq v_b$. If the bit-flip probability $p_f$ is independent of whether a bit has value 0 or 1, then, by symmetry, the probability of value 0 or 1 remains ½ after random bit-flipping. That is, the probability of 0 is the probability of starting with 0 and not flipping the bit plus the probability of starting with 1 and flipping the bit:

$$\frac{1}{2}p_f = \frac{1}{2}. \tag{45}$$

Accordingly, the probability $P_M$ of a false positive event M is:

$$p_U = Pr\{d(a', b') \geq t \mid v_a = v_b\} \tag{7}$$

and then $$p_U = B(t, n, n, p_\triangle). \tag{8}$$

because when $v_a = v_b$, their hash codes are equal, i.e., a=b. Given that, adding noise must have introduced at least t disagreements to obtain the result of $d(a', b') \geq t$. For each bit position, the probability of introducing disagreement is $p_\triangle$.

To minimize the probabilities of false positive and false negative matches, as mismatches (false positive) and missed matches (false negative) are disjoint, the probability of either happening is at most the maximum of these probabilities.

Given that, the probability of an erroneous match (either a mismatch or a missed match) is:

$$p_W \leq \max(p_M, p_U). \tag{9}$$

This can be shown as follows.

$$p_W = Pr\{M \vee U\} \tag{10}$$

Since event M indicates that $v_a \neq v_b$ and event U indicates that $v_a = v_b$, they are disjoint events so that $$p_W = Pr\{M\} + Pr\{U\}. \text{ As} \tag{11}$$

$$Pr\{U\} = Pr\{d(a', b') \geq t \wedge v_a = v_b\}$$

$$= Pr\{d(a', b') \geq t \mid v_a = v_b\}Pr\{v_a = v_b\} \tag{12}$$

$$= p_U Pr\{v_a = v_b\}. \tag{13}$$

Similarly, $$Pr\{M\} = p_M Pr\{v_a \neq v_b\}. \tag{14}$$

$$p_W = Pr\{M\} + Pr\{U\} \tag{15}$$

$$= p_M Pr\{v_a \neq v_b\} + p_U Pr\{v_a = v_b\} \tag{16}$$

As $Pr\{v_a \neq v_b\} = 1 - Pr\{v_a \neq v_b\}$, thus $\tag{17}$ $$p_W = p_M(1 - Pr\{v_a = v_b\}) + p_U Pr\{v_a = v_b\}$$

Since this is a convex combination, therefore, $$P_W \leq \max(p_M, p_U).$$

Given this condition, by linearity of expectations, the expected number of matching errors w of either type over all pairs in Q is the probability for each pair, $p_W$, times $|Q|$. That is:

$$\mathbb{E}_w = p_W|Q| \tag{19}$$

$$\leq \max(p_M, p_U)|Q| \tag{20}$$

$$= \max(p_M, p_U)\left[\left(\sum_{i=1}^{s}m_i \atop 2\right) - \sum_{i=1}^{s}\binom{m_i}{2}\right]. \tag{21}$$

With respect to the distribution of the number of matching errors, by applying Markov's inequality to nonnegative random variable w, using the above equations for the expectation, it can be shown that:

$$\forall h \geq 0: Pr\{w \geq h\} \leq \frac{\max(p_M, p_U)|Q|}{h} \tag{22}$$

When h=1, the probability of no matching errors can then be expressed as:

$$Pr\{w = 0\} \geq 1 - \max(p_M, p_U)|Q|. \tag{23}$$

As discussed herein, an event R occurs for a noisy key when the median key of a set of noisy keys obtained based on the same hash code equal to the original hash code. The probability for event R to happen may be formulated as follows. Given a set of noisy keys corresponding to the same hash code, let $p_R$ (z) be the probability that, for a set of z noisy keys that correspond to the same hash code, for all n positions, the median bit value is the same as the bit value on that position in the hash code. When there are at most $\lfloor z/2 \rfloor$ bit flips, then the median bit value remains the same as the hash code bit value. This is independent among all positions. That is, $$p_R = B\left(0, \left\lfloor \frac{z}{2} \right\rfloor, z, p_f\right)^n. \tag{24}$$

For the expected number of noisy keys having hash codes "revealed" by the median keys, if r denotes the number of noisy keys for which event R occurs, then the expected value of r can be expressed as.

$$\mathbb{E}r \le \max_{z \in \{1, \ldots, s\}} p_R(z) \sum_{i=1}^{s} m_i. \tag{25}$$

As each noisy key is included in a set of from 1 to s noisy keys with the same hash code, $p_R(Z)$ is a probability of event R for some $z \in \{1, \ldots, s\}$. Based on linearity of expectation, $p_R(Z)$ may be derived based on values over the number of noisy keys. These formulations reveal the relationship between the performance metrics ($P_M$, $P_U$, and $P_R$) and sketch merging parameters ($p_f$, n, and t). That is, the sketch merging parameters may be determined accordingly by the PDSMP generator 120.

As shown in FIG. 3A, the PDSMP generator 120 comprises a $P_R$ based bit flipping probability determiner 300, a similarity threshold determiner 310, and a key length determiner 320. The $P_R$ based bit flipping probability determiner 300 is provided for estimating the flipping probability $p_f$ given input s and $P_R$ based on Equation (24) as shown above. In some embodiments, the flipping probability $p_f$ may be estimated via a search. For each z in 1 to s: a binary search may be performed over values of $p_f$ using Equation 24 to find a minimum $p_f$ value so that the values of $p_R$ (z) does not exceed the specified $P_R$ representing the upper bound of $p_R(z)$.

Such estimated bit flipping probability $p_f$ is then provided to the similarity threshold determiner 310 to estimate the threshold value t that can be used by the sketch merging process to meet the specified performance metric $P_U$ (upper bound of false negative in identifying matching noisy keys). In some embodiments, to be conservative, the maximum value of $p_f$, or $p_f*$, that satisfies the required $P_R$ may be used for this purpose. Plug into Equation (2), $$p_\Delta = 2p_f*(1 - p_f*).$$

The threshold values t may then be estimated by performing a binary search based on Equation (8) using $p_\Delta$ computed above based on $p_f*$. A minimum t* of all t values so searched may be selected as the similarity threshold for the sketch merging operation to satisfy the specified performance metric $P_U$.

With the estimated t* (which is determined based on the estimated $p_f*$), the key length determiner 320 is provided for computing the length of code n needed to ensure that the performance metric $P_M$ (upper bound of false positive in identifying matching noisy keys) is satisfied given the parameters $p_f$ and t based on Equation (6). In some embodiments, the value of n may be provided based on the actual length of hash codes used by the data sketch sources. In this case, the given n may be used to evaluate whether it is feasible, i.e., whether it is capable of satisfying $P_M$ based on Equation (6). In some embodiments, n may be computed based on the specified performance metric $P_M$ so that the n that is capable of satisfying the performance metrics may be provided, together with the bit flipping probability $p_f$, to the data sketch sources 110 to generate both hash codes of length n and the noisy keys according to $p_f$ to ensure that specified $P_M$, consequently $P_U$ and $P_R$ can be satisfied.

Figure 3B:
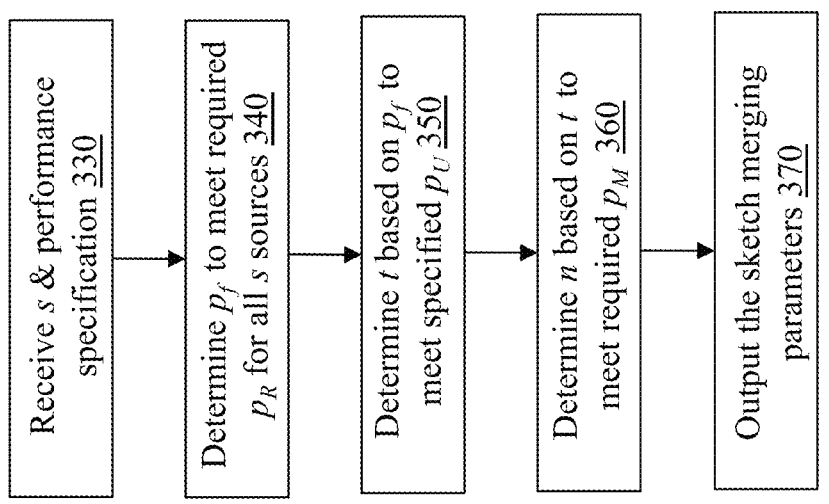
FIG. 3B is a flowchart of an exemplary process of a PDSMP generator, in accordance with an embodiment of the present teaching.

FIG. 3B is a flowchart of an exemplary process of the performance-driven sketch merging parameter (PDSMP) generator, in accordance with an embodiment of the present teaching. Various information to be used to determine sketch merging parameters is received at 330, the $P_R$-based bit flipping probability determiner 300 is invoked to determine $p_f$ based on the specified $P_R$ and s. Such determined $p_f$ is then used by the similarity threshold determiner 310 to determine, at 350, the threshold t to be used during merging to decide whether a pair of noisy keys match to meet the specified $P_U$. The determined t is then used by the key length determiner 320 to determine, at 360, the length of code n that satisfies the specified performance metric $P_U$. Such determined sketch merging related parameters are then output, at 370, to the storage 130. As discussed herein, the sketch parameters include both the key obfuscation parameters (n, $p_f$) as well as parameter t used in merging process.

Figure 4A:
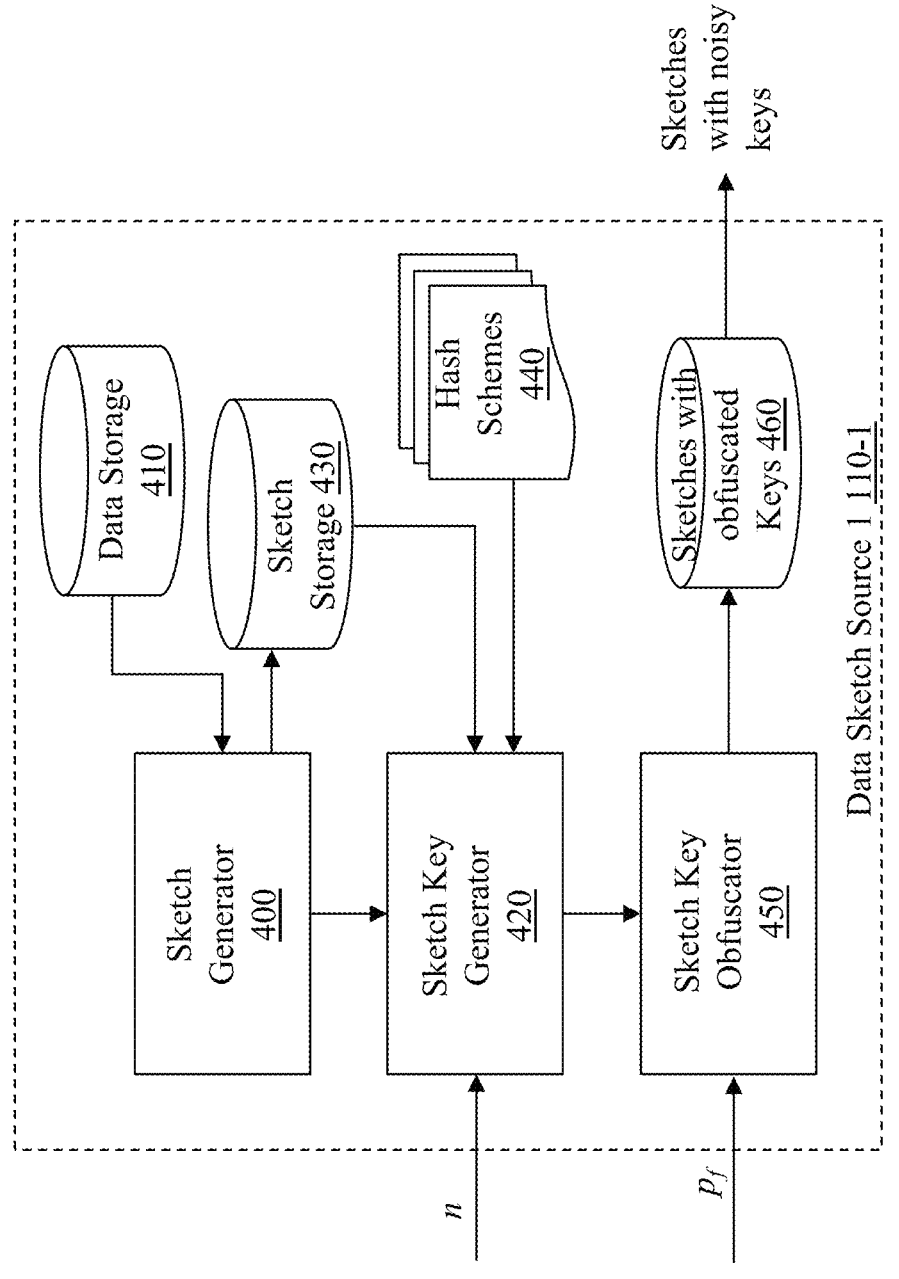
FIG. 4A depicts an exemplary high-level system diagram of a data sketch source, in accordance with an embodiment of the present teaching.

FIG. 4A depicts an exemplary high-level system diagram of a data sketch source (e.g., 110-1), in accordance with an embodiment of the present teaching. As discussed herein, a data sketch source may generate data sketched based on sketch merging parameters (n, $p_f$) to generate sketches with noisy keys so that such data sketches may be merged with other sketches to meet the specified performance metrics with respect to privacy protection. To achieve that, the data sketch source 110-1 illustratively comprises a sketch generator 400, a sketch key generator 420, and a sketch key obfuscator 450.

Figure 4B:
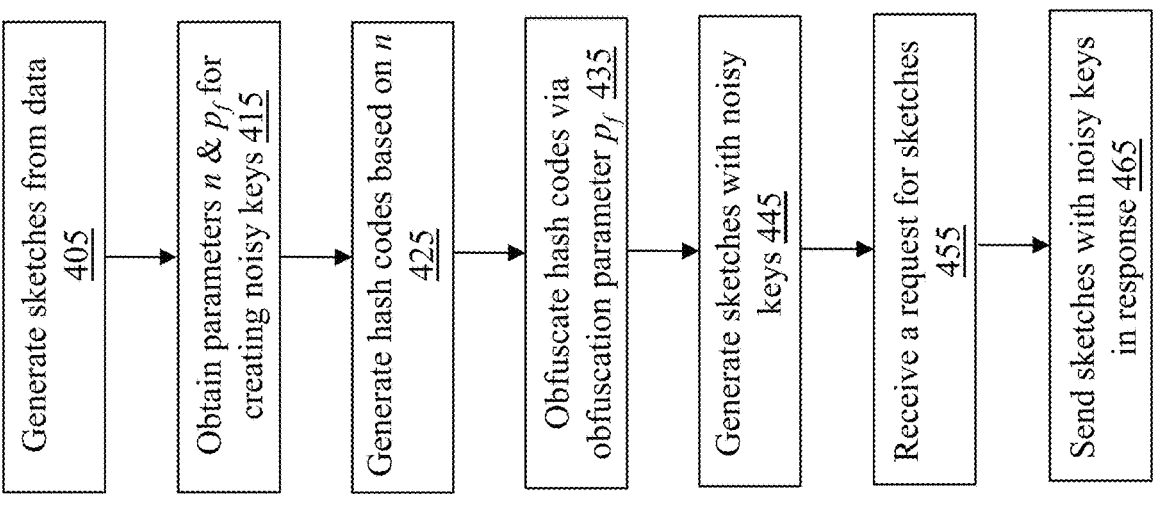
FIG. 4B is a flowchart of an exemplary process of a data sketch source, in accordance with an embodiment of the present teaching.

FIG. 4B is a flowchart of an exemplary process of data sketch source 110-1, in accordance with an embodiment of the present teaching. The sketch generator 400 is provided for generating, based on its data stored in data storage 410, sketches at 405 and storing the generated sketches in a sketch storage 430. In some embodiments, to generate sketches with noisy keys that can data privacy with respect to the performance metrics, the sketch key generator 420 obtains, at 415, the hash code length n as determined according to the present teaching, and generates, at 425, the hash codes for data based on the code length n. To obfuscate such generated hash codes of length n, the sketch key obfuscator 450 obfuscates, at 435, the hash codes based on the input parameter $p_f$ by bit flipping according to the probability $p_f$. With the obfuscated noisy keys, sketches with noisy keys are generated, at 445, and stored in a storage 460 for sketches with obfuscated keys. When a request is received, at 455, for sketches, the requested sketches are sent, at 465, in response to the request.

Figure 5A:
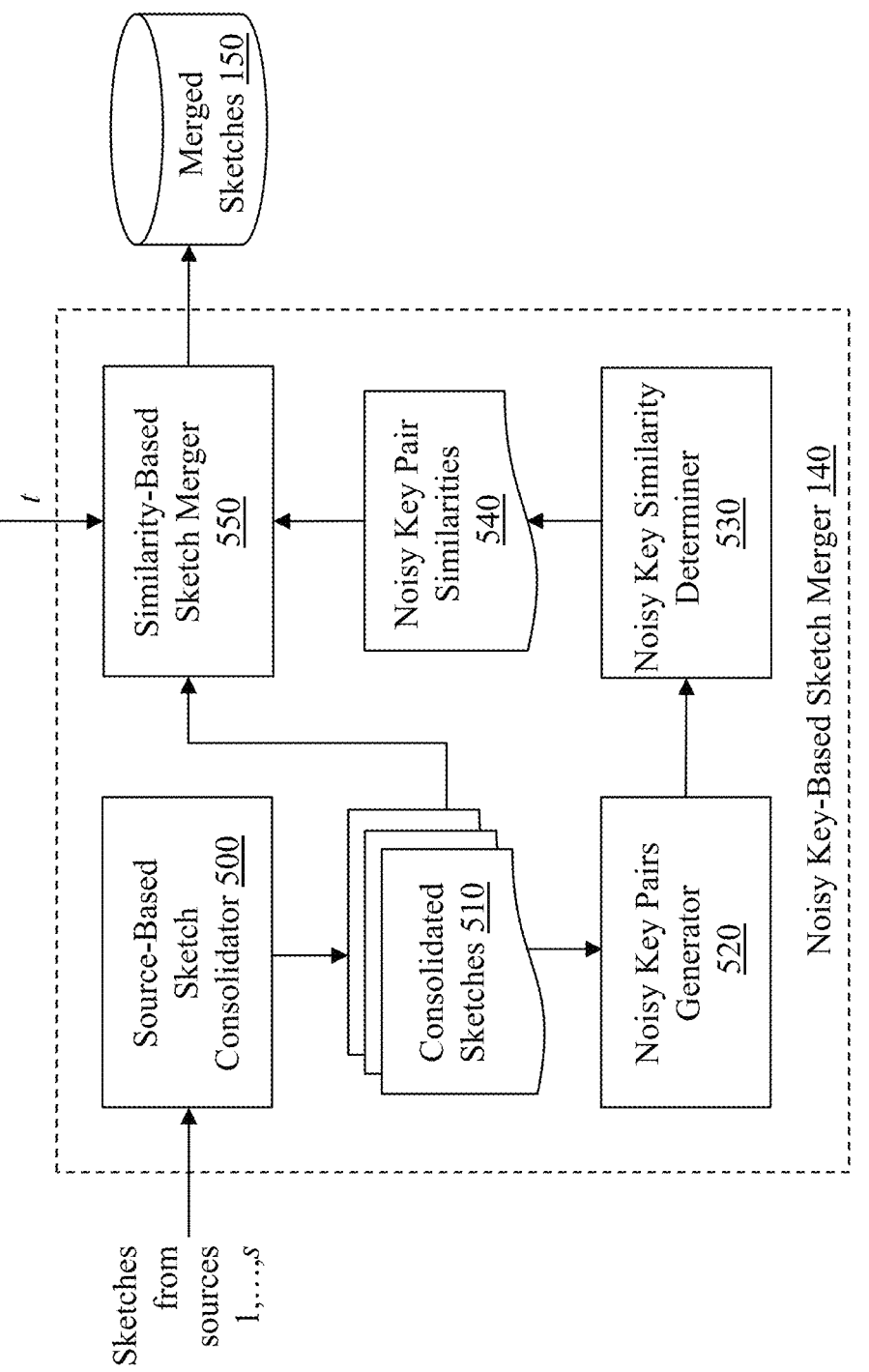
FIG. 5A depicts an exemplary high-level system diagram of a noisy key-based sketch merger, in accordance with an embodiment of the present teaching.
Figure 5B:
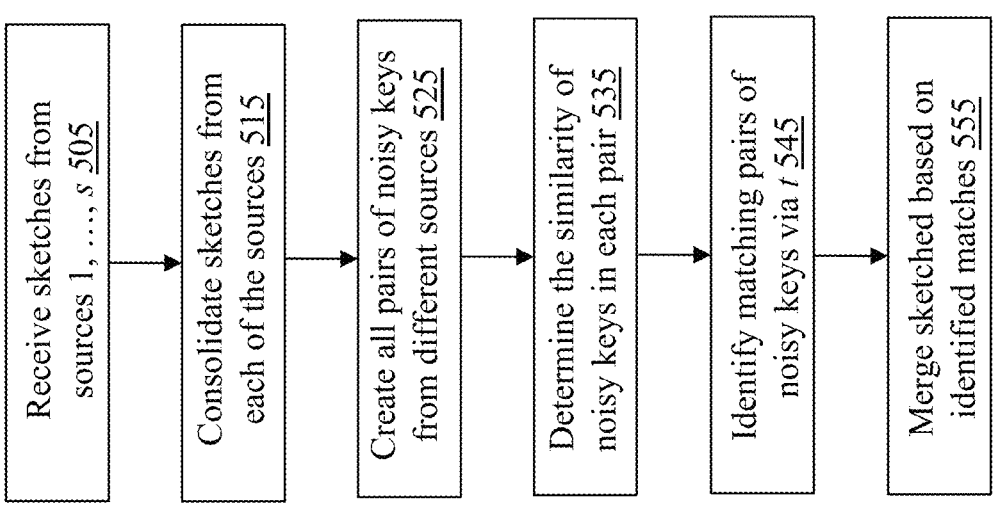
FIG. 5B is a flowchart of an exemplary process of a noisy key-based sketch merger, in accordance with an embodiment of the present teaching.

FIG. 5A depicts an exemplary high-level system diagram of the noisy key-based sketch merger 140, in accordance with an embodiment of the present teaching. As discussed herein, the sketches with noisy keys from different data sketch sources 110 are merged by the noisy key-based sketch merger 140 based on parameter t, determined to meet the specified performance metrics in order to protect the privacy of the data. In this illustrated embodiment, the noisy key-based sketch merger 140 comprises a source-based sketch consolidator 500, a noisy key pairs generator 520, a noisy key similarity determiner 530, and a similarity-based sketch merger 550. FIG. 5B is a flowchart of an exemplary process of the noisy key-based sketch merger 140, in accordance with an embodiment of the present teaching. The source-based sketch consolidator 500 may be provided to receive, at 505, sketches with noisy keys from different data sketch sources 110 and may consolidate, at 515, the received information according to, e.g., the source it came from to generate consolidated data sketches 510. With the data sketches with noisy keys from different sources in 510, the noisy key pairs generator 520 is provided to create, at 525, pairs of noisy keys from different sources. As discussed herein, each pair include two noisy keys from different data sketch sources for the purpose of determining whether two noisy keys in each of the pairs are corresponding to the same hash codes. The noisy key similarity determiner 530 is provided to determine, at 535, a similarity of two noisy keys in every of the noisy key pairs and store, e.g., in a storage for the noisy key pair similarities 540. The similarity-based sketch merger 550 is provided for carrying out the merge by identifying, at 545, matching pairs of noisy keys from different sources based on their similarity measures in accordance with the threshold t, determined to ensure that the merged result satisfy specified performance metrics. Based on the matching pairs. The matching pairs of noisy keys are then used by the similarity-based sketch merger 550 to generate merged sketches 150.

Figure 6:
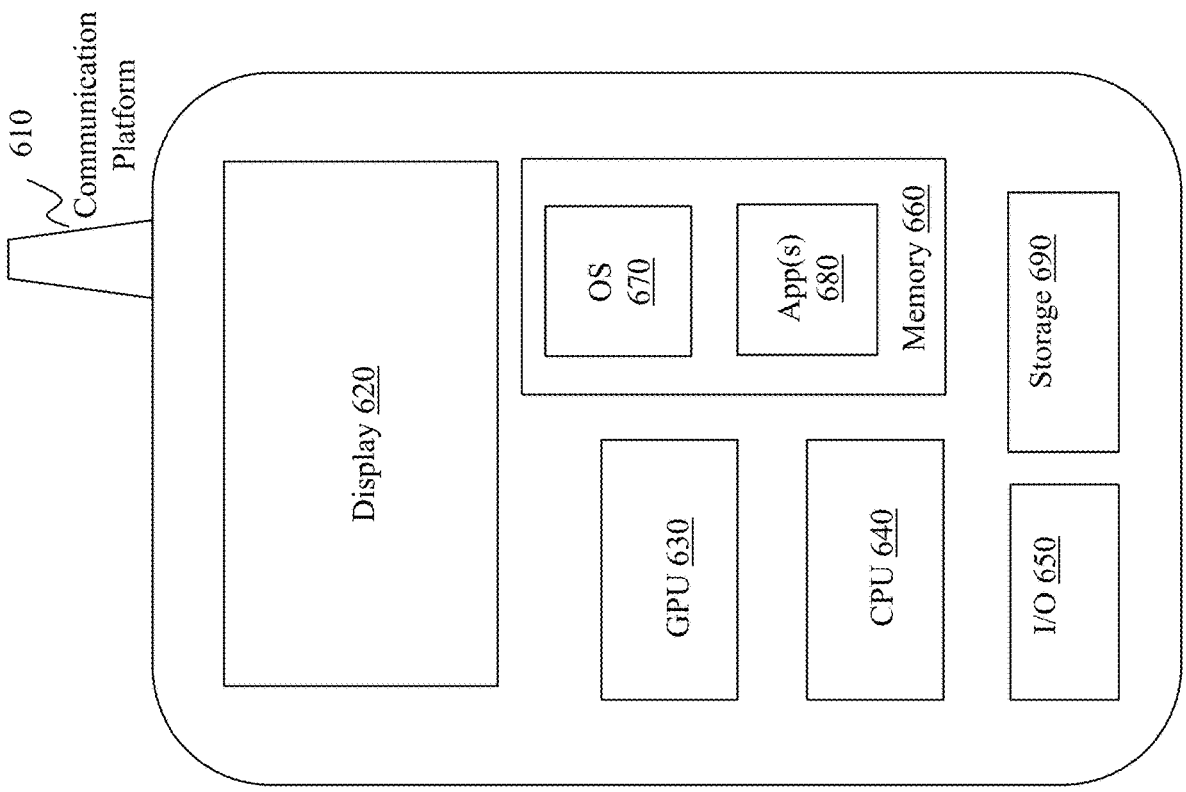
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching may be implemented corresponds to a mobile device 600, including, but not limited to, a smart phone, a tablet, a music player, a handled gaming console, a global positioning system (GPS) receiver, and a wearable computing device, or in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 650. Any other suitable component, including but not limited to a system bus or a controller (not shown), may also be included in the mobile device 600. As shown in FIG. 6, a mobile operating system 670 (e.g., iOS, Android, Windows Phone, etc.), and one or more applications 680 may be loaded into memory 660 from storage 690 in order to be executed by the CPU 640. The applications 680 may include a user interface or any other suitable mobile apps for information analytics and management according to the present teaching on, at least partially, the mobile device 600. User interactions, if any, may be achieved via the I/O devices 650 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 7:
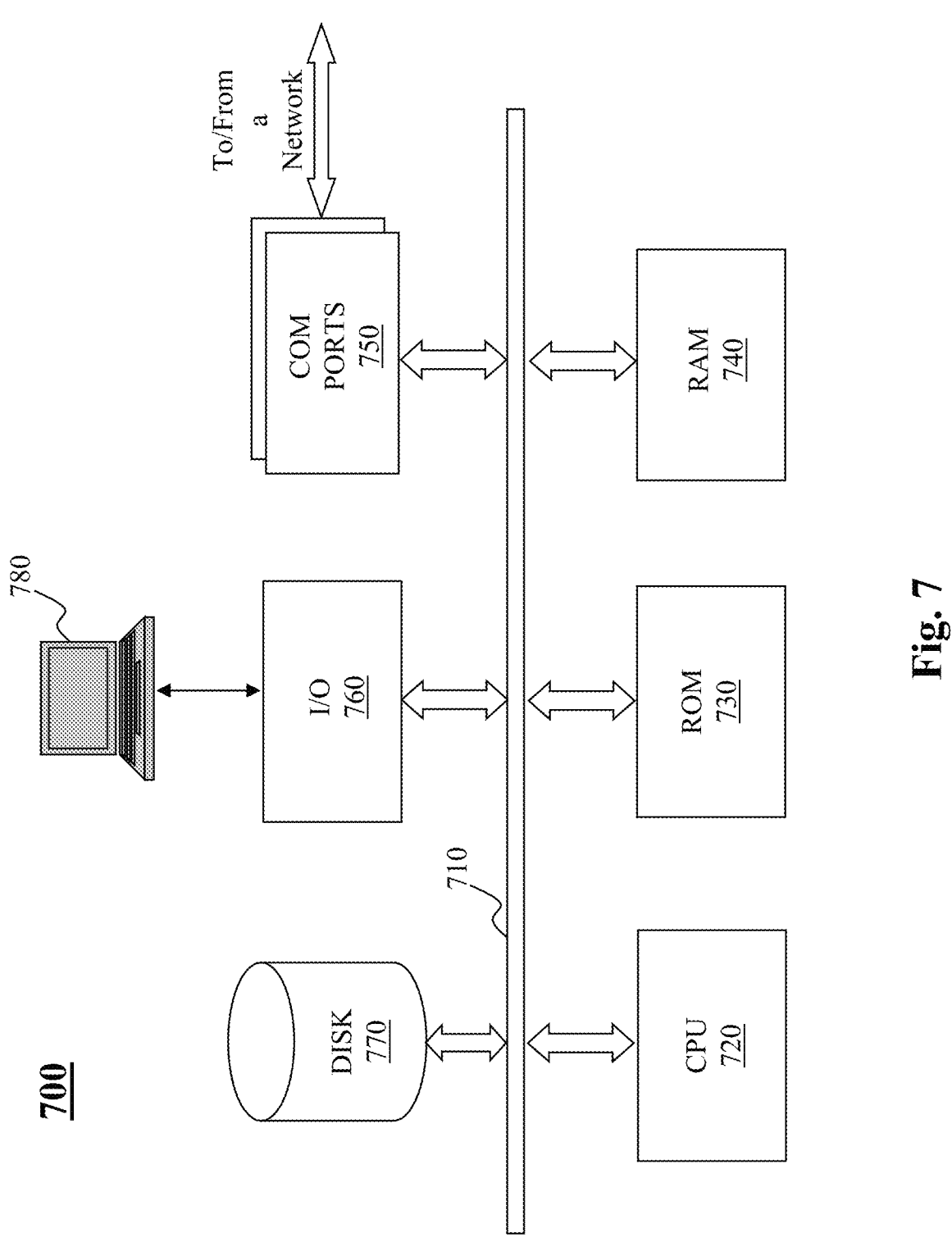
FIG. 7 is an illustrative diagram of an exemplary computing device architecture that may be used to realize a specialized system implementing the present teaching in accordance with various embodiments.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 700 may be used to implement any component or aspect of the framework as disclosed herein. For example, the information analytical and management method and system as disclosed herein may be implemented on a computer such as computer 700, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM) 730, or random-access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, comprising:
   receiving performance metrics specified with respect to a merged sketch from a plurality of sketches from a plurality of data sketch sources, wherein the performance metrics include:
   a first metric specifying an upper bound of false positive probability in identifying matching obfuscated keys from different data sketch sources, a second metric specifying an upper bound of false negative probability in identifying matching obfuscated keys from different data sketch sources, and
   a third metric specifying an upper bound of a probability of inferring an original key based on multiple obfuscated keys generated based on the original key;
   generating sketch merging parameters in accordance with the performance metrics, wherein the sketch merging parameters include a first set relating to generating obfuscated keys for the plurality of sketches and a second set relating to identifying matching obfuscated keys;
   receiving the plurality of sketches from the plurality of data sketch sources, wherein each of the plurality of sketches includes obfuscated keys generated based on the first set of sketch merging parameters; and
   merging the sketches by identifying matching obfuscated keys in accordance with the second set of sketch merging parameters to generate a merged sketch.

2. The method of claim 1, wherein the first set of the sketch merging parameters include:
   a number of bits used to generate keys of data in the plurality of sketches; and
   a bit flipping probability for flipping each bit of a key when obfuscating a key.

3. The method of claim 2, wherein the second set of the sketch merging parameters includes a threshold to be used in determining whether two obfuscated keys correspond to the same original key.

4. The method of claim 3, wherein the step of generating the sketch merging parameters comprises:
   determining the bit flipping probability based on the third metric;
   determining the threshold based on the second metric and the bit flipping probability; and
   determining the number of bits used to generate the codes based on the first metric and the threshold.

5. The method of claim 1, wherein the step of merging the sketches comprises:
   identifying pairs of obfuscated keys, wherein each of the pairs includes two obfuscated keys from different data sketch sources;
   obtaining a similarity measure between two obfuscated keys in each of the pairs;
   determining whether the two obfuscated keys in each of the pairs match based on the similarity measure thereof and the second set of sketch merging parameters;
   selecting matching pairs with the two obfuscated keys therein are determined to match; and
   generating the merged sketch based on the matching pairs.

6. The method of claim 1, further comprising:
   receiving a query for information associated with the sketches from the plurality of data sketch sources; and
   identifying the information in response to the query based on the merged sketch.

7. A machine-readable and non-transitory medium having information recorded thereon, wherein the information, when read by the machine, causes the machine to perform the following steps:
   receiving performance metrics specified with respect to a merged sketch from a plurality of sketches from a plurality of data sketch sources, wherein the performance metrics include:
   a first metric specifying an upper bound of false positive probability in identifying matching obfuscated keys from different data sketch sources, a second metric specifying an upper bound of false negative probability in identifying matching obfuscated keys from different data sketch sources, and a third metric specifying an upper bound of a probability of inferring an original key based on multiple obfuscated keys generated based on the original key;

generating sketch merging parameters in accordance with the performance metrics, wherein the sketch merging parameters include a first set relating to generating obfuscated keys for the plurality of sketches and a second set relating to identifying matching obfuscated keys;

receiving the plurality of sketches from the plurality of data sketch sources, wherein each of the plurality of sketches includes obfuscated keys generated based on the first set of sketch merging parameters; and merging the sketches by identifying matching obfuscated keys in accordance with the second set of sketch merging parameters to generate a merged sketch.

8. The medium of claim 7, wherein the first set of the sketch merging parameters include:

a number of bits used to generate keys of data in the plurality of sketches; and a bit flipping probability for flipping each bit of a key when obfuscating a key.

9. The medium of claim 8, wherein the second set of the sketch merging parameters includes a threshold to be used in determining whether two obfuscated keys correspond to the same original key.

10. The medium of claim 9, wherein the step of generating the sketch merging parameters comprises:

determining the bit flipping probability based on the third metric;

determining the threshold based on the second metric and the bit flipping probability; and determining the number of bits used to generate the codes based on the first metric and the threshold.

11. The medium of claim 7, wherein the step of merging the sketches comprises:

identifying pairs of obfuscated keys, wherein each of the pairs includes two obfuscated keys from different data sketch sources;

obtaining a similarity measure between two obfuscated keys in each of the pairs;

determining whether the two obfuscated keys in each of the pairs match based on the similarity measure thereof and the second set of sketch merging parameters;

selecting matching pairs with the two obfuscated keys therein are determined to match; and generating the merged sketch based on the matching pairs.

12. The medium of claim 7, wherein the information, when read by the machine, further causes the machine to perform the following steps:

receiving a query for information associated with the sketches from the plurality of data sketch sources; and identifying the information in response to the query based on the merged sketch.

13. A system, comprising:

memory storing computer program instructions; and one or more processors that, in response to executing the computer program instructions, effectuate steps comprising:

receiving performance metrics specified with respect to a merged sketch from a plurality of sketches from a plurality of data sketch sources, wherein the performance metrics include:

a first metric specifying an upper bound of false positive probability in identifying matching obfuscated keys from different data sketch sources, a second metric specifying an upper bound of false negative probability in identifying matching obfuscated keys from different data sketch sources, and a third metric specifying an upper bound of a probability of inferring an original key based on multiple obfuscated keys generated based on the original key;

generating sketch merging parameters in accordance with the performance metrics, wherein the sketch merging parameters include a first set relating to generating obfuscated keys for the plurality of sketches and a second set relating to identifying matching obfuscated keys;

receiving the plurality of sketches from the plurality of data sketch sources, wherein each of the plurality of sketches includes obfuscated keys generated based on the first set of sketch merging parameters; and merging the sketches by identifying matching obfuscated keys in accordance with the second set of sketch merging parameters to generate a merged sketch.

14. The system of claim 13, wherein the first set of the sketch merging parameters include:

a number of bits used to generate keys of data in the plurality of sketches, and a bit flipping probability for flipping each bit of a key when obfuscating a key; and the second set of the sketch merging parameters includes a threshold to be used in determining whether two obfuscated keys correspond to the same original key.

15. The system of claim 14, wherein the step of generating the sketch merging parameters comprises:

determining the bit flipping probability based on the third metric;

determining the threshold based on the second metric and the bit flipping probability; and determining the number of bits used to generate the codes based on the first metric and the threshold.

16. The system of claim 13, wherein the step of merging the sketches comprises:

identifying pairs of obfuscated keys, wherein each of the pairs includes two obfuscated keys from different data sketch sources;

obtaining a similarity measure between two obfuscated keys in each of the pairs;

determining whether the two obfuscated keys in each of the pairs match based on the similarity measure thereof and the second set of sketch merging parameters;

selecting matching pairs with the two obfuscated keys therein are determined to match; and generating the merged sketch based on the matching pairs.

17. The system of claim 13, wherein the steps further comprise:

receiving a query for information associated with the sketches from the plurality of data sketch sources; and identifying the information in response to the query based on the merged sketch.

* * * * *